(12) United States Patent
Murata

(10) Patent No.: US 7,735,588 B2
(45) Date of Patent: Jun. 15, 2010

(54) SUSPENSION SYSTEM FOR SUSPENDING A WHEEL HAVING A MOTOR THEREIN

(75) Inventor: Satoshi Murata, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 660 days.

(21) Appl. No.: 10/559,762

(22) PCT Filed: May 12, 2004

(86) PCT No.: PCT/JP2004/006706

§ 371 (c)(1),
(2), (4) Date: Dec. 7, 2005

(87) PCT Pub. No.: WO2005/000621

PCT Pub. Date: Jan. 6, 2005

(65) Prior Publication Data

US 2006/0272871 A1    Dec. 7, 2006

(30) Foreign Application Priority Data

Jun. 25, 2003    (JP) .............................. 2003-181498

(51) Int. Cl.
*B60K 1/00*    (2006.01)
(52) U.S. Cl. .................................. 180/65.51; 280/291
(58) Field of Classification Search ................. 180/65.5, 180/65.51, 65.1, 55, 291
See application file for complete search history.

(56) References Cited

U.S. PATENT DOCUMENTS

| 4,913,258 | A | * | 4/1990 | Sakurai et al. ............... 180/242 |
| 5,289,905 | A | * | 3/1994 | Braschler .................... 188/296 |
| 5,355,039 | A |   | 10/1994 | Couture |
| 6,057,617 | A | * | 5/2000 | Schmid ........................ 310/77 |
| 6,113,119 | A | * | 9/2000 | Laurent et al. ........... 280/124.1 |
| 2004/0099455 | A1 |  | 5/2004 | Nagaya |

FOREIGN PATENT DOCUMENTS

| EP | 0 492 290 A1 | 12/1991 |
| JP | A 02-120198 | 5/1990 |
| JP | A 10-305735 | 11/1998 |
| JP | A 2000-343920 | 12/2000 |
| JP | 2003300420 A * | 10/2003 |
| JP | A 2003-300420 | 10/2003 |
| JP | A 2004-115014 | 4/2004 |
| WO | WO 02/083446 A1 | 10/2002 |
| WO | WO 02-083446 A1 * | 10/2002 |

* cited by examiner

*Primary Examiner*—Paul N Dickson
*Assistant Examiner*—Katy Meyer
(74) *Attorney, Agent, or Firm*—Oliff & Berridge, PLC

(57) ABSTRACT

A suspension system 10 for a vehicle for suspending a wheel 1 is disclosed. An outer rotor type motor 20 is provided within the wheel 1. The motor 20 has a stator (28, 30) provided on an outer surface of a cylindrical member 24 that defines space 70 open to at least an inboard side of the vehicle, and a rotor (22,26) rotatably supported by the cylindrical member 24. The wheel 1 receives the motor 20 and is connected to the rotor (22,26). The mounting portions of suspension arms (50,52,54) are provided on an inner surface of the cylindrical member 24.

10 Claims, 2 Drawing Sheets

SUSPENSION SYSTEM FOR SUSPENDING A WHEEL HAVING A MOTOR THEREIN

TECHNICAL FIELD

The present invention relates to a suspension system for use in a vehicle, which suspends a wheel inside which a motor for driving the wheel is provided.

BACKGROUND ART

JP2-120198 A discloses a suspension system for use in a vehicle, wherein a motor for driving the wheel is provided inside the wheel. In this suspension system, an outer portion of the motor, which corresponds to the rotor portion of the motor, is connected to a wheel disk, while an inner portion of the motor, which corresponds to the stator portion of the motor, is supported so as not to rotate with respect to a vehicle body.

In the conventional suspension system as disclosed in JP2-120198 A, there is no other choice but to dispose a braking system or a suspension arm on the central side of the vehicle with respect to the motor, because the motor occupies a large amount of space inside the wheel and substantially no available space remains around the center of the wheel due to existence of other components such as a hub. Concerning the steering wheel, in particular, a strong constraint is placed on an installing position and the shape of a suspension arm to avoid the interference between the suspension arm and the motor during steering operations. Thus, with such arrangements, functions required intrinsically for a suspension system cannot be achieved.

Further, with the arrangement in which the braking system is installed on the central side of the vehicle with respect to the motor, stronger constraint may be placed on the installing position of a suspension arm due to a disk rotor or a drum of the brake disk. Furthermore, this arrangement lowers a cooling characteristic of the braking system.

DISCLOSURE OF INVENTION

It is an object of the present invention to provide a suspension system in which a suspension and/or a braking system are/is disposed within a wheel in an effective manner.

In order to achieve the above-mentioned objects, according to one aspect of the present invention a suspension system for a vehicle is provided, comprising: an outer rotor type motor having a stator provided on an outer surface of a cylindrical member that defines space open to at least an inboard side of the vehicle, and a rotor rotatably supported by the cylindrical member, wherein the outer rotor type motor is provided within a wheel and the rotor of the outer rotor is connected to the wheel; and a suspension arm whose mounting portion is provided on an inner surface of the cylindrical member.

According to this aspect of the present invention, providing the mounting portion of the suspension arm on the inner surface of the cylindrical member increases the degree of flexibility in designing the suspension arms and an alignment change of the suspension system. This enables giving the suspension system desired functions that are intrinsically required for the suspension system, even with the suspension system in which a motor is disposed within the wheel.

Advantageously, the suspension system may include a bearing that is arranged between the cylindrical member and the rotor and outboard of the rotor. This arrangement enables minimizing the length of the path over which various loads, such as up-and-down loads, transverse loads, and back-and-forth loads applied to the wheel, a braking torque of a braking system, and a driving torque of the motor, are transferred. This allows miniaturization of the components over the load-transferring path and thus cost reduction.

Advantageously, the suspension system may include a sealing that is arranged between the cylindrical member and the rotor and inboard of the rotor; and a sealing second bearing that is arranged between the cylindrical member and the rotor and adjacent to the sealing. This arrangement stabilizes and improves a sealing characteristic between the cylindrical member and the rotor of the motor, because the arrangement in which the second bearing is provided adjacent to the sealing can reduce the variance of the engaging margin of the sealing lip due to deformations of the cylindrical member and the rotor portion of the motor. It is noted that the second bearing may be a deep groove small bearing rather than a bearing that serves a function of carrying loads applied to the wheel, such as a bearing disposed on the outboard side of the motor.

Further, a brake disk may be connected to the rotor in such a manner that a disk surface of the brake disk is located within the space defined by the cylindrical member. With this arrangement, airflow generated through the space facilitates the cooling efficiency of the brake disk surface and the rotor. Further, disposing the brake disk surface outboard of the vehicle with respect to the mounting positions of the suspension arms allows the ideal positioning of the suspension arms and the braking system within the wheel.

Other objects, features and advantages of the present invention will become more apparent from the following detailed description when read in conjunction with the accompanying drawings.

BEST MODE FOR CARRYING OUT THE INVENTION

Hereafter, the preferred embodiments according to the present invention are explained with reference to the drawings.

Figure 1:
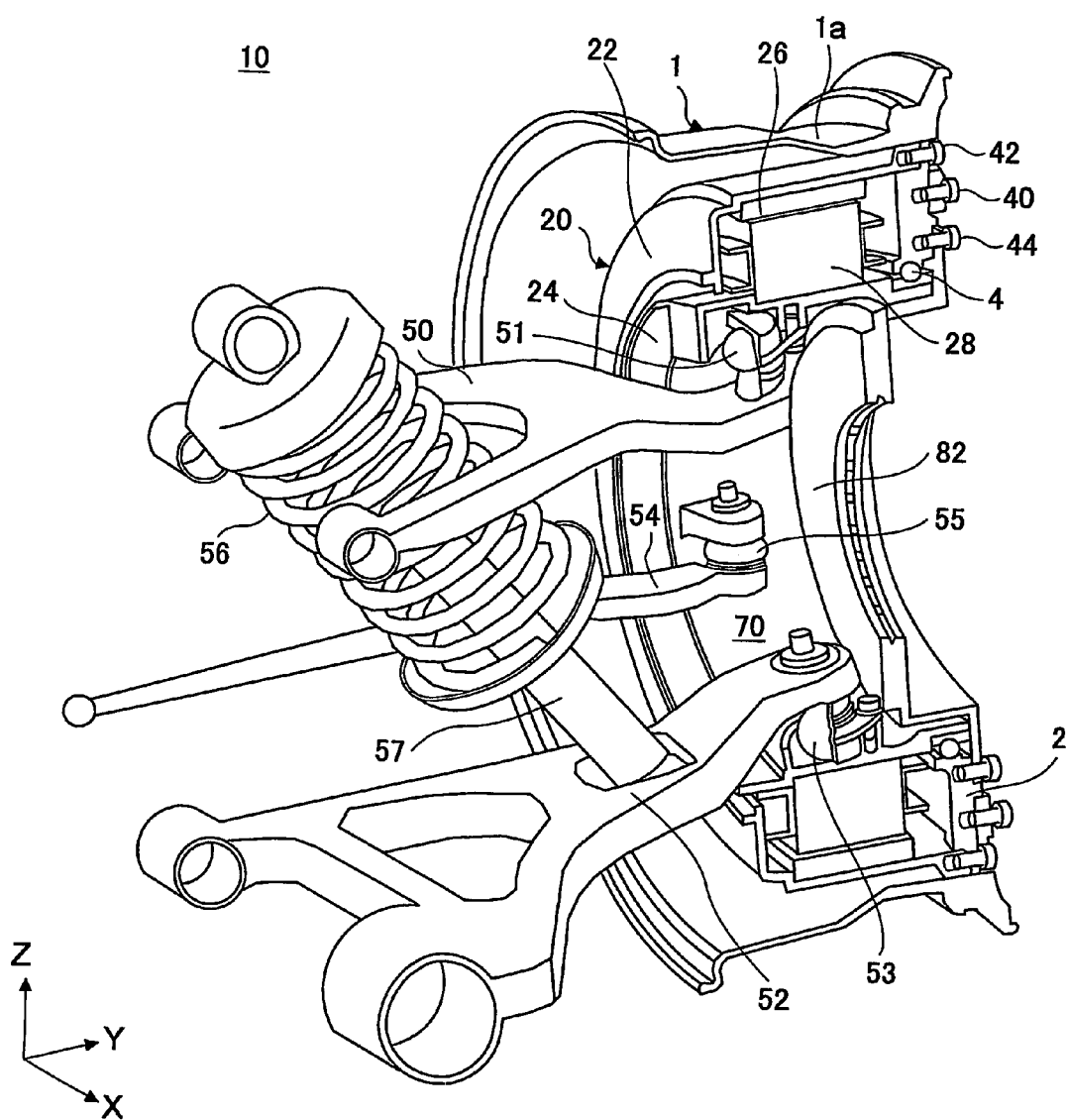
FIG. 1 is a diagram showing a suspension system according to an embodiment of the present invention in perspective view seen from an inboard side of a vehicle.
Figure 2:
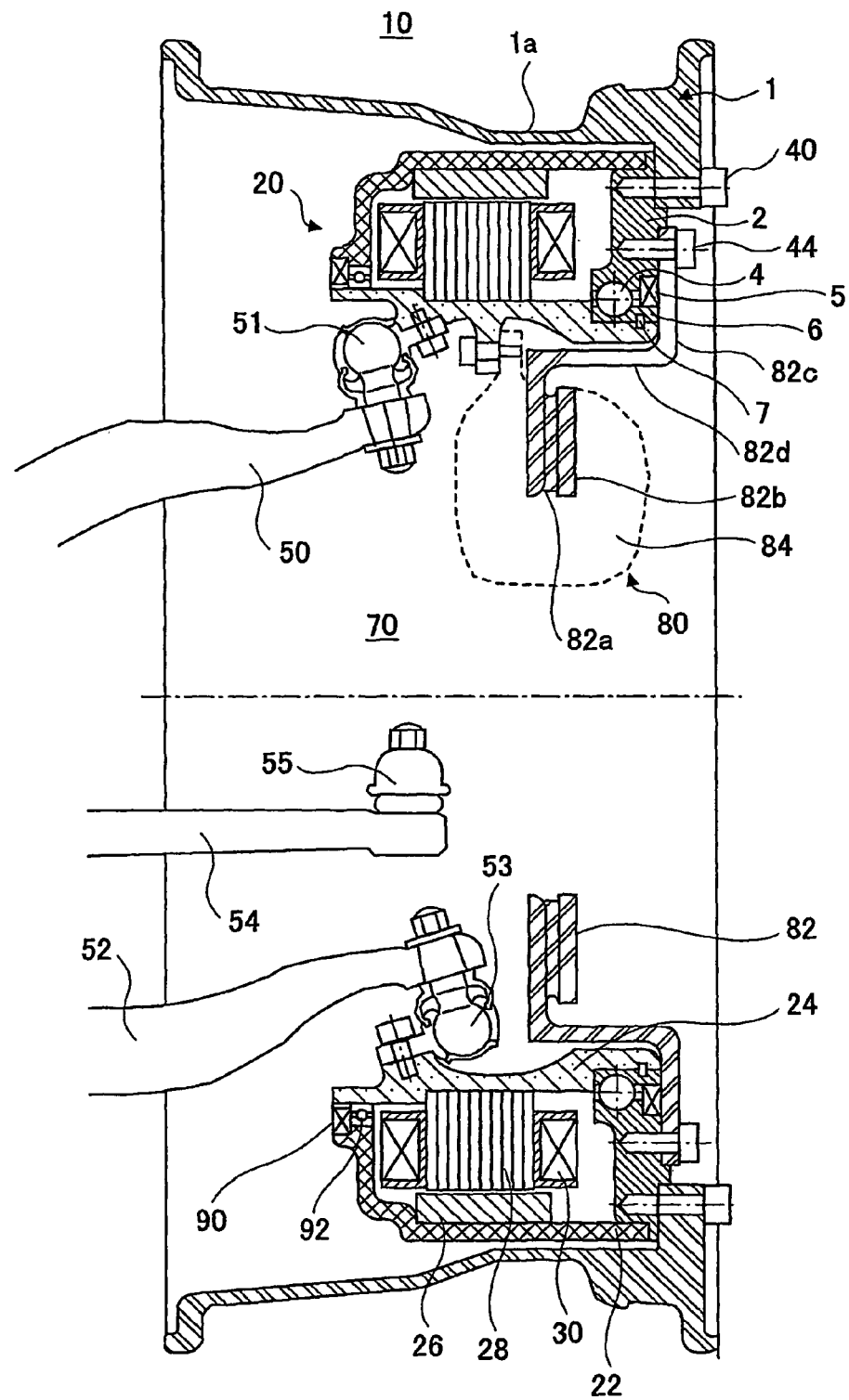
FIG. 2 is a cross-sectional view of a main part of the suspension system 10 shown in FIG. 1 as bisected by a vertical plane including a centerline connected between wheel centers.

FIG. 1 is a diagram showing a suspension system 10 according to an embodiment of the present invention by a sectional structure in part and in perspective view seen from an inboard side of a vehicle. FIG. 2 is a cross-sectional view of a main part of the suspension system 10 shown in FIG. 1.

The suspension system according to this embodiment has a motor 20 for driving a wheel. One of the motors 20 is provided in every wheel of the vehicle. Explanation is made below for only one wheel, since there is substantially no difference in arrangement between the wheels. However, it is noted that the arrangement according to this embodiment may be applied to only front wheels or only rear wheels.

Referring to FIG. 1 and FIG. 2, the motor 20 is disposed inside a wheel 1, as further discussed below. The motor 20 has a ring-like shape that corresponds to an inner periphery of the wheel 1. The motor 20 has an outer casing 22 opposed to the inner periphery of the wheel 1. The outer casing 22 has a cylindrical shape whose radius is equal to or slightly less than the radius of the inner periphery of the wheel 1. In other words, the outer casing 22 may be disposed against the inner periphery of the wheel 1 or disposed away from the inner periphery by a slight amount of clearance. Alternatively, the outer casing 22 may be physically integrated into the wheel 1.

On the outer casing 22 is provided an inner casing 24 such that the inner casing 24 is opposed to an inner periphery of the outer casing 22. The inner casing 24 has a cylindrical shape. Between the inner periphery of the outer casing 22 and the inner casing 24 is formed space that accommodates components of the motor 20 described below. To the inner periphery of the outer casing 22 is attached a permanent magnet 26 using appropriate means such as a bolt and an adhesive. The permanent magnet 26 has a ring shape and is attached on the inner periphery of the outer casing 22. On an outer periphery of the inner casing 24 is attached an annular core 28 around which coils 30 are wound. It is noted that the inner periphery of the inner casing 24 does not necessarily have an annular surface as long as the outer periphery of the inner casing 24 has an annular surface. For example, projections or depressions may be formed on the inner periphery of the inner casing 24. Further, although the inner casing 24 shown in FIG. 2 has a cylindrical outside shape inside of which substantially cylindrical space is established, the inner casing 24 may has other configurations as long as they define space open to the inboard side of the vehicle. For example, the inner casing 24 may define space that is enclosed on the inboard side of the vehicle.

On the outboard side (with respect to a transverse direction of the vehicle) of the outer casing 22 and the inner casing 24 is installed a hub 2. The hub 2 has an annular shape that can be accommodated between the outer casing 22 and the inner casing 24, as shown in FIG. 2. The hub 2 may be fixed to the wheel 1 in the vicinity of a wheel rim 1a by means of a bolt 40, and additionally to the outer casing 22 in the vicinity of the wheel rim 1a by means of a bolt 42, as shown in FIG. 1. In this way, the outer casing 22 (including the permanent magnet 26) of the motor 20 of this embodiment is configured to rotate with the wheel 1 (including a tire). It is noted that the hub 2 may be bolted to the wheel 1 together with the outer casing 22 and the outer casing 22 may be fixed directly to the wheel 1.

Between the hub 2 and the inner casing 24 is provided an axle bearing 4. The axle bearing 4 carries a transverse load, a vertical load, etc., applied to the wheel 1 (including a tire) while allowing relative rotation between the inner casing 24 and the hub 2. The axle bearing 4 shown in FIG. 2 is comprised of single row and four points contact type of bearing balls, the bearing balls being disposed along the perimeter of the inner casing 24 and spaced at regular intervals. Alternatively, the axle bearing 4 may be a double row angular bearing that can offer the same function as single row and four points contact types of bearings. In the embodiment shown in FIG. 2, an inner race 6 of axle bearing 4 is fitted into the inner casing 24 and a stopper ring 7 is provided to constrain displacement of the inner race 6 with respect to the inner casing 24. Alternatively, the inner race 6 and the inner casing 24 may be coupled using bolts or be formed integrally.

On the inner periphery of the inner casing 24 are attached ends of suspension arms via ball joints. More specifically, on the upper side of the inner periphery of the inner casing 24 with respect to the vertical direction is attached an end of an upper arm 50 via a ball joint 51 and on the lower side is attached an end of a lower arm 52 via a ball joint 53. The other ends of the upper arm 50 and the lower arm 52 are pivotablly attached to a vehicle body (not shown) such as a chassis frame via bushings. Further, on the inner periphery of the inner casing 24 is connected a tie rod 54 (a rod-like member in the case of the rear wheels, if necessary), which comprises a part of a steering mechanism, via a ball joint 55. A coil spring 56 and a shock absorber 57 are arranged between the lower arm 52 and the vehicle body, as shown in FIG. 1, and serve a function of lessening and absorbing vertical vibrations of the wheel 1 (including a tire).

As is apparent from the foregoing, the inner casing 24 of the motor 20 of this embodiment is allowed to rotate relative to the wheel 1 and the outer casing 22 while it is not allowed to rotate relative to the vehicle body. In other words, in this embodiment, the outer casing 22 (including the permanent magnet 26) comprises a rotating portion (an outer portion) of the motor 20 and the inner casing 24 (including a stator portion such as a core 28, etc.) comprises a non-rotating portion (an inner portion) of the motor 20.

Here, with a conventional arrangement in which a motor is disposed using the space near the center of the wheel, a motor that occupies most of the space within the wheel places a constraint on the mounting positions of the suspension arms. For this reason, according to such a conventional arrangement, there is no other choice but to dispose suspension arms on the central side of the vehicle with respect to the motor 20, resulting in difficulties in giving the suspension arms the functions that are intrinsically required for suspension arms.

To the contrary, according to this embodiment, near the center of wheel is formed a relatively large space 70 (the space defined by the inner periphery of the inner casing 24) by setting an outer radius of the motor 20 (i.e., an outer radius of the outer casing 22) as large as possible with respect to an inner radius of the wheel 1 and by biasing positions of the respective components of the motor 20 toward the periphery side of the wheel 1 and the outboard side of the vehicle while keeping the desired functions of those components.

According to this embodiment, since the space 70 opposed to the inner side of the motor 20 is established, it becomes possible to set all of the mounting positions of the suspension arms in the space 70, that is, on the inner side of the motor 20 (i.e., the inner periphery of the inner casing 24). For example, as is apparent from FIG. 1 and FIG. 2, the respective ball joints are all located inside the space 70.

Therefore, according to this embodiment, even with the arrangement in which the motor 20 is disposed within the wheel 1, it becomes possible to freely design the mounting positions of the suspension arms to the wheel 1 without constraints due to the existence of the motor 20. In other words, an alignment change or an ideal location of a king pin required for desired suspension functions can be designed freely without constraints due to the motor 20. Further, the degree of flexibility in designing the configuration of the suspension arms is improved, since the probability of interference between suspension arms and the motor is minimized. Furthermore, it also becomes possible to set the mounting positions of the coil spring 56 and the shock absorber 57 to the wheel 1 further to the outboard side of the vehicle.

Next, a braking system according to this embodiment is described with reference to FIG. 1 and FIG. 2. In this embodiment, within the space 70 opposed to the inner side of the motor 20 is provided a braking system 80. More specifically, a brake disk (rotor) 82 and a brake caliper 84 (whose shape is indicated by an imaginary line in FIG. 2) are disposed within the space 70 underlying inside of the motor 20. The brake disk 82 in this embodiment is an annular member having a circular opening 82a at the center thereof. The brake caliper 84 is disposed such that it sandwiches a sliding surface 82b of the brake disk 82 via the opening 82a of the brake disk 82, that is, from the inner side of the brake disk 82. The brake caliper 84 is fixed to the inner periphery of the inner casing 24 by means of bolts and the like. The mounting position of the brake caliper 84 to the inner casing 24 is designed to be close to the mounting position of the suspension arm to the inner casing 24 both in a circumferential direction of the wheel 1 and in a transverse direction of the vehicle, insuring no interference with the suspension arm. It is noted that the brake caliper 84 may be any type of brake caliper, such as a stationary caliper type, a floating caliper type, etc.

An outer surface 82c of the brake disk 82 is fixed to the hub 2 by means of bolts 44. According to the brake disk 82 shown in FIG. 2, the sliding surface 82b situated within the space 70 is connected to the outer surface 82c, which is opposed to the outboard side of the motor 20, via a flange surface 82d. It is noted that the outer surface 82c of the brake disk 82 may be bolted to the wheel 1 together with the hub 2 (for example, by means of the bolt 44 adjacent to the axle bearing 4).

In this way, according to this embodiment, even with the arrangement in which the motor 20 is disposed within the wheel 1, it becomes possible to dispose the brake disk 82 within the wheel 1. In other words, it becomes possible to dispose the brake disk 82 within the wheel 1 while keeping an ideal mounting position of the suspension arm.

Further, in this embodiment, the connecting points between the hub 2 and the wheel 1 are provided on the outer side of the wheel 1 (i.e., adjacent to the rim 1a). This eliminates the need for a central portion of a disk surface of the wheel 1 in terms of structure and strength. Thus, it becomes possible to fully or partially eliminate the central portion of the wheel 1 (or increase an area of aperture) to facilitate the ventilation of air via the space 70. Consequently, this improves the cooling efficiency of the braking system (brake disk 82) and the motor 20.

Further, in this embodiment, a braking torque, which is generated at the time when the brake caliper 84 is pressed against the brake disk 82 from its inner side, is transferred from the wheel 1 to the inner casing 24 via the brake disk 82 and the brake caliper 84. Further, a driving torque generated between the permanent magnet 26 and the core 28 or the coil 30 is transferred directly to the wheel 1 from the permanent magnet 26 (the outer casing 22) via the hub 2 without a reduction gear and the like. In this way, according to this embodiment, since the path over which the braking torque and the driving torque are transferred is short, it becomes possible to minimize sizes (weights and costs) of the components operating over the transferring path. From a similar viewpoint, the radial position of the axle bearing 4 with respect to the wheel center is designed so as to substantially correspond to the radial position of the mounting points of the suspension arms. In other words, the radial position of the axle bearing 4 substantially corresponds to the radial position of the base surface of the inner casing 24.

Next, referring to FIG. 1 and FIG. 2 again, on the outboard side of the motor 20 is provided a ring-like outer sealing 5. The outer sealing 5 is arranged between the inner race 6 of the axle bearing 4 and the hub 2. The outer sealing 5 serves a function of sealing a gap between the inner casing 24 and the outer casing 22 on the outboard side of the vehicle.

On the inboard side of the motor 20 is provided a ring-like inner sealing 90 formed from rubber. The inner sealing 90 is provided to seal a gap between the inner casing 24 and the outer casing 22 on the inboard side of the vehicle. The inner sealing 90 serves a function of preventing the entry of dust into the motor 20 as well as the leakage of oil or grease from the motor 20.

On the outboard side of the inner sealing 90 is provided a deep groove small bearing 92. The deep groove small bearing 92 is arranged adjacent to the inner sealing 90. With this arrangement, the deep groove small bearing 92 keeps the gap between the inner casing 24 and the outer casing 22 substantially constant when various loads (including a rotational reaction force) from the outside are applied to the motor 20 and thus stabilizes an engaging margin of a sealing lip of the inner sealing 90, resulting in a high sealing characteristic between the inner casing 24 and the outer casing 22. In particular, in the case in which the outer diameter of the motor 20 is set large according to a large inner diameter of the wheel 1, as is the case with this embodiment, the diameter of the inner sealing 90 becomes large accordingly, which may cause instability of the engaging margin of the sealing lip. Therefore, arranging the deep groove small bearing 92 adjacent to the inner sealing 90 has a significant advantage in that it can minimize the variance of the engaging margin of the sealing lip.

As is apparent from the foregoing, the deep groove small bearing 92 may be an other type of bearing. However, since the main purpose of the bearing 92 is to stabilize the engaging margin of the sealing lip of the inner sealing 90, as discussed above, a deep groove ball bearing with small balls in a single row, instead of a bearing which can carry a high load such as the aforementioned axle bearing 4, is sufficient for this purpose.

The present invention is disclosed with reference to the preferred embodiment. However, it should be understood that the present invention is not limited to the above-described embodiment, and variations and modifications may be made without departing from the scope of the present invention.

For example, although the above-mentioned embodiment is related to a double wishbone type suspension, it can be applied to other types of suspensions. For example, with respect to a strut type suspension, the same advantages or effects as described with reference to the above-mentioned embodiment can be equally attained by fixing the shock absorber 57 (and the coil spring 56) directly to the inner periphery of the inner casing 24.

Further, the foregoing description is based on an assumption that the vehicle include four wheels; however, the present invention can be applied to other types of vehicles such as vehicles with two wheels.

The invention claimed is:

1. A suspension system for a vehicle, comprising:
an outer rotor type motor having a stator provided on an outer surface of a cylindrical member that defines a space open to at least an inboard side of the vehicle, and a rotor rotatably supported by the cylindrical member, wherein
the outer rotor type motor is provided within a wheel and the rotor of the outer rotor type motor is connected to the wheel;
a suspension arm whose mounting portion includes ball joints that are provided on a radial inner surface of the cylindrical member; and
a hub fixed to the wheel in the vicinity of a wheel rim and connected to the cylindrical member via a bearing that allows relative rotation between the cylindrical member and the wheel, wherein
the hub has an annular shape so as to be accommodated between the cylindrical member and the rotor, such that load inputs to the wheel, such as vertical transverse loads and back-and-forth loads, are transmitted to the cylindrical member only via the rotor and the bearing, the load inputs then being received by the suspension arm.

2. The suspension system of claim 1, further comprising:
a sealing arranged between the cylindrical member and the rotor and inboard of the rotor; and
a second bearing arranged between the cylindrical member and the rotor and adjacent to the sealing.

3. The suspension system of claim 1, wherein a brake disk is connected to the rotor and disposed such that a disk surface of the brake disk is located within the space defined by the cylindrical member.

4. The suspension system of claim 3, wherein the brake disk is bolted to the hub adjacent to the bearing.

5. The suspension system of claim 2, wherein a brake disk is connected to the rotor and disposed such that a disk surface of the brake disk is located within the space defined by the cylindrical member.

6. The suspension system of claim 1, wherein the bearing is one of a double row angular bearing, and a single row and four points contact type bearing.

7. The suspension system of claim 2, wherein the bearing is one of a double row angular bearing, and a single row and four points contact type bearing.

8. The suspension system of claim 3, wherein the bearing is one of a double row angular bearing, and a single row and four points contact type bearing.

9. The suspension system of claim 4, wherein the bearing is one of a double row angular bearing, and a single row and four points contact type bearing.

10. The suspension system of claim 5, wherein the bearing is one of a double row angular bearing, and a single row and four points contact type bearing.

* * * * *